United States Patent [19]

Tal

[11] Patent Number: 4,945,357
[45] Date of Patent: Jul. 31, 1990

[54] JOYSTICK ASSEMBLY

[75] Inventor: Amir Tal, Natanya, Israel

[73] Assignee: Rotal Industries & Trading Ltd., Natanya, Israel

[21] Appl. No.: 331,825

[22] Filed: Apr. 3, 1989

Related U.S. Application Data

[63] Continuation-in-part of Ser. No. 238,332, Aug. 29, 1988.

[51] Int. Cl.[5] .............................................. H03M 11/00
[52] U.S. Cl. ...................................... 341/20; 340/709; 200/6 A; 273/148 B
[58] Field of Search ..................... 341/20, 22; 340/709; 200/6 A; 273/148 B; 364/190

[56] References Cited

U.S. PATENT DOCUMENTS

| | | | |
|---|---|---|---|
| 4,492,830 | 1/1985 | Kim | 200/6 A |
| 4,575,591 | 3/1986 | Lugaresi | 341/20 |
| 4,614,847 | 9/1986 | Sasso | 200/6 |
| 4,731,530 | 3/1988 | Mikan | 250/229 |
| 4,786,768 | 11/1988 | Langewis et al. | 200/6 A |
| 4,825,019 | 4/1989 | Fisher | 200/6 A |

Primary Examiner—Parshotam S. Lall
Assistant Examiner—Tyrone Queen
Attorney, Agent, or Firm—James H. Beusse

[57] ABSTRACT

A joystick assembly for converting push-button keys to joystick actuation comprises a handle and a multi-arm member, the multi-arm member includes arms located for contact with keys of a computer keyboard, each arm having a depending end for engaging a respective key. The handle inserts perpendicularly through the multi-arm member through a central aperture and is adjustable perpendicularly with respect to the keyboard. Apparatus is incorporated for fastening an end of the handle to a central key of a keyboard.

12 Claims, 2 Drawing Sheets

JOYSTICK ASSEMBLY

This is a continuation-in-part of U.S. patent application Ser. No. 07/238,332 filed Aug. 29, 1988.

BACKGROUND OF THE INVENTION

The present invention relates to joystick assemblies and, more particularly, to a joystick assembly for use with a keyboard for converting movement of a joystick handle to actuation of selected keys of a keyboard.

Computers are generally provided with a keyboard having at least one set of keys arranged in the format of a typewriter keyboard. To one side of this set of keys, there is normally provided a "numerical key pad" arranged in a common calculator arrangement, i.e., a 3×3 pattern for keys corresponding to numbers 1-9. These numerical keys, which are essentially push button switches, have also been adapted to control other functions of the computer. The keys corresponding to numerals 2, 4, 6 and 8 are also utilized as cursor control keys for moving a position cursor on a computer display by one increment, e.g., up or down one line and left or right one position. The keys corresponding to numerals 3 and 9 are also utilized for moving the cursor up and down one page at a time. The keys corresponding to numerals 1 and 7 also serve as "end" and "home" keys for moving a cursor to end and home positions in one move.

It is expected that a computer operator will manipulate these cursor control keys in the same manner as a typist, i.e., by manually depressing a desired key. However, computers are often used in other modes than word processing. In particular, computers are frequently used to create drawings using various CAD programs and more frequently to play various computer games. In these latter modes, movement of the cursor is a primary concern and it is desirable to be able to make such movements without observing finger positions on the keys. While some applications require cursor movements to be controlled by a "mouse" attachment, others, particularly games, allow joysticks to be used. The problem with both the mouse and joystick is that they require separate input cables to the computer and additional hardware for accepting external input.

More recently, it has been proposed to construct a joystick which can be attached to an ordinary keyboard and positioned such that movement of the joystick actuates the cursor control keys. One such joystick is shown in U.S. Pat. No. 4,575,591. The joystick described in this patent requires a panel-like base member attachable to the keyboard frame with a joystick handle attached to the base member and spaced from the keys. A universal mount is attached to the base member and engages the lower end of the handle to allow handle movement in any tiltable direction. Actuating arms are mounted on the base member such that they can be engaged by movement of the handle to force them into contact with the keys. In addition to the relative complexity of this joystick attachment, a relatively large base member is required to be attached to the keyboard. Furthermore, while the above described patent disclosed an attachment for a computer keyboard, it will be recognized that other devices, such as hand-held games, have cursor control keys which would be desirably actuated from a joystick if such could be provided.

SUMMARY OF THE INVENTION

It is a general object of the present invention to provide a relatively simple joystick for attachment to a keyboard for operating cursor control keys.

It is a more specific object of the invention to provide a joystick for operating cursor control keys which can be easily attached and removed and has no separately movable parts during use.

The above and other objects, features and advantages are attained in a joystick assembly comprising a handle, a multi-arm member attached to a lower portion of the handle and a base member which is adhesively fixed to a center key in a cursor control keypad. The lower end of the handle is removably attachable to the base member and is formed of a reduced diameter. The handle is constructed of a material that allows flexing of the reduced diameter end. The multi-arm member comprises plural outwardly extending arms terminating in downward extending ends. Movement of the handle causes the arms to engage selected ones of the keys. Preferably, the arm ends are of different lengths to accommodate the differing relative heights of keys on a keyboard.

BRIEF DESCRIPTION OF THE DRAWINGS

For a better understanding of the present invention, reference may be had to the following detailed description taken in conjunction with the accompanying drawings in which.

DETAILED DESCRIPTION OF THE PREFERRED EMBODIMENT

Figure 1:
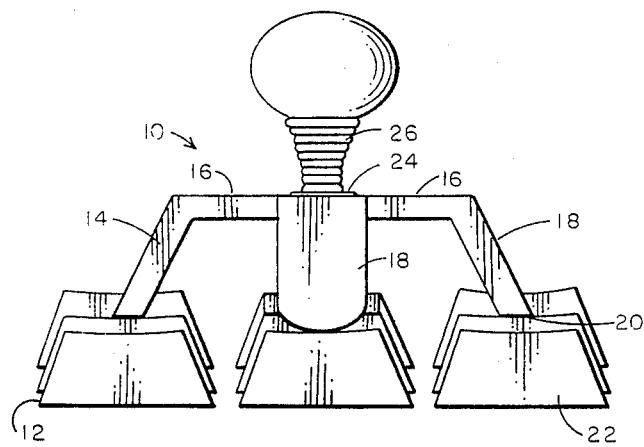
FIG. 1 is a frontal view of one form of joystick assembly according to the teaching of the invention.

FIG. 1 illustrates one form of the present invention depicting a joystick assembly 10 mounted on a numerical keypad section of a keyboard 12 and viewed from the keyboard. The keyboard is assumed to a type 5060 or 5151 keyboard commonly used in computer systems. The computer and computer display are not illustrated but will be recognized to be an inherent part of an operating system. The joystick assembly 10 includes a multi-arm member 14 having circumferentially spaced, radially extending to L-shaped arms 16 terminating in downwardly extending ends 18 of various lengths so that terminal ends 20 are spaced an equidistance from keys 22 to be actuated. The member 14 incorporates a center aperture 24 for receiving a handle 26. The aperture 24 and handle 26 are each sized to form a non-slip union of the member 14 to the handle 26.

Figure 2:
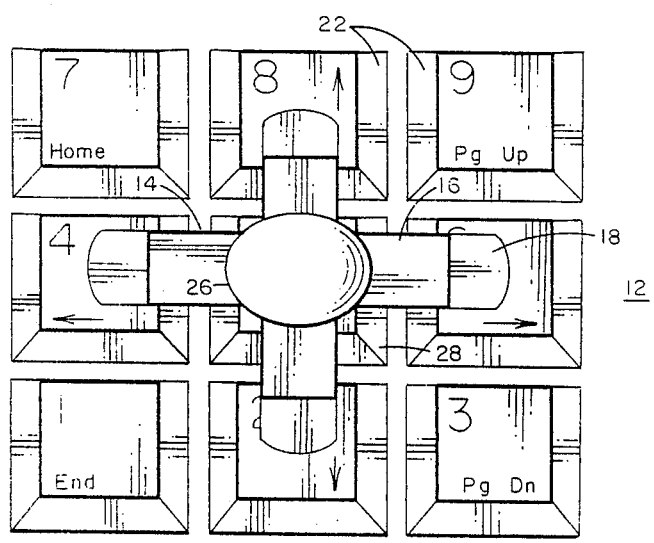
FIG. 2 is a top view of the assembly of FIG. 1.

FIG. 2 is a top view of the joystick assembly of FIG. 1 positioned on a central key 28 of keyboard 12 with the arms 16 of the multi-arm member 14 and their respective depending ends 18 in position above cursor control keys 22. The handle 26 is shown as it protrudes vertically upward through the multi-arm member 14.

Figure 3:
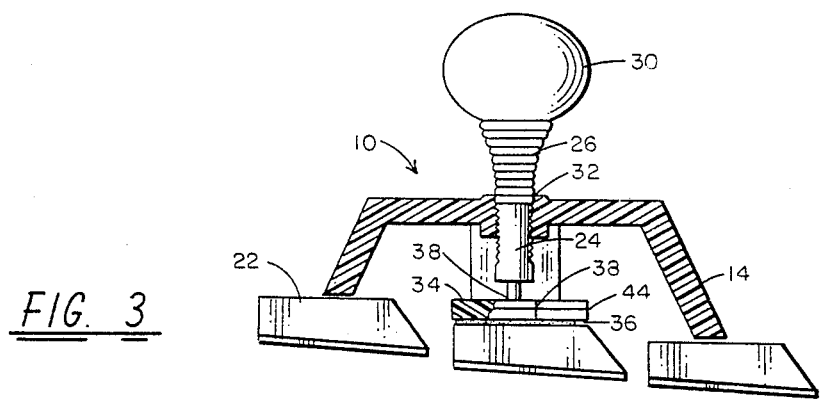
FIG. 3 is a partial cross-sectional side view of the assembly of FIG. 1.

FIG. 3 is a cross-sectional view of the joystick assembly FIG. 1. The handle 26 may include an enlarged upper portion 30 suitable for gripping by a user. At the area indicated at 32, the handle is sized to fit snugly within aperture 24 in multi-arm member 14. The fit between handle 26 and member 14 may be a sliding fit with both handle 26 and aperture 24 being concentrically circular or both may be provided with locking means, such as a tab and slot, to prevent relative rotational movement. Alternatively, the handle and aperture could each be threaded.

Figure 5:
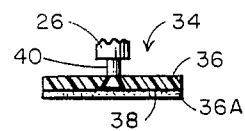
FIG. 5 is a cross-sectional view illustrating one form of mount for the joystick assembly.

The joystick assembly is preferably attached in position over the cursor control keys using a mounting means 34 attachable to the center key, usually the number 5 key. The mounting means 34, in one form, comprises a relatively thin, plastic pad 36 having a shape conforming to the size and shape of the top surface of the center key. An adhesive is applied to a lower side of the pad 36 allowing it to be adhered to the top surface of the center key. Double-sided tape 36A may be used for this purpose (see FIG. 5). The pad 36 may be formed with a center aperture 38 for receiving a lower end 40 of the handle 26. The end 40 is formed with a reduced diameter so that it is relatively flexible as compared to the remainder of the handle. The extreme lower end of end portion 40 may be slightly enlarged and the aperture 38 formed with an undercut opening allowing the end portion 40 to snap into aperture 38. In another embodiment, the lower end 40 may be threaded along with aperture 38 for removably connecting handle 26 to pad 36. In the particular embodiment shown in FIG. 3, the extreme lower end of end portion 40 terminates in a truncated pyramid shaped member 42. A mating dovetail slot 44 is formed in pad 36 so that member 42 can be slipped into slot 44 from one side of pad 36. The slot 44 extends into pad 36 a distance sufficient to center handle 26 over pad 36 when member 26 is fully inserted.

Figure 4:
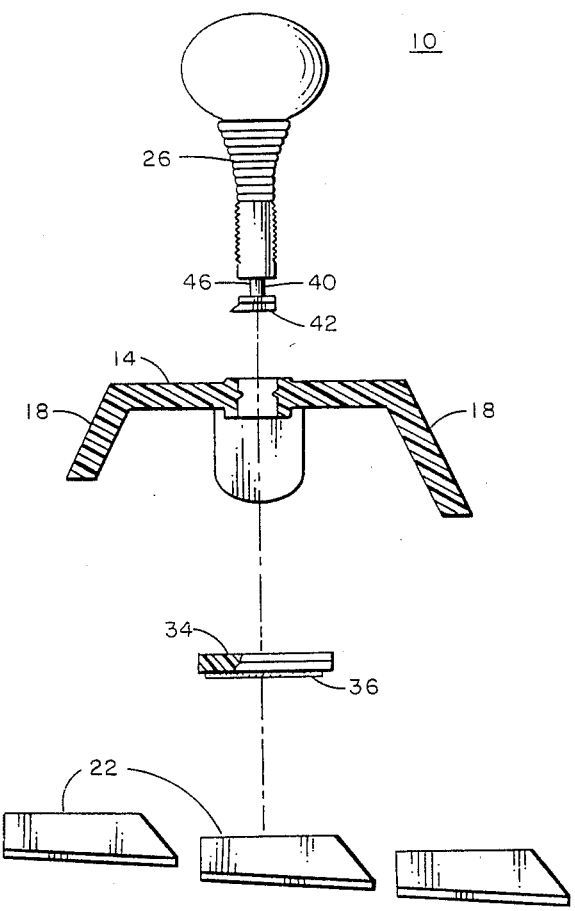
FIG. 4 is an exploded view of the joystick assembly of FIG. 3.

FIG. 4 is an exploded view of the joystick 10 as shown in FIG. 3, i.e., the multi-arm member 14 and pad 36 are in cross-section. FIG. 4 illustrates more clearly the configuration of end member 42. This view also illustrates end portion 40 as including a reduced diameter portion 46 which allows flexing of the handle 26 about pad 36.

In using the inventive joystick, varying degrees of sensitivity, i.e., the amount of movement of handle 26 necessary to depress a key, can be achieved by adjusting the position of multi-arm member 14 on handle 26 so as to vary the distance between arm ends 18 and their associated keys.

While the principles of the invention have now been made clear in an illustrative embodiment, it will become apparent to those skilled in the art that many modifications of the structures, arrangements and components presented in the above illustrations may be made in the practice of the invention in order to develop alternate embodiments suitable to specific operating requirements without departing from the scope and principles of the invention as set forth in the claims which follow. Furthermore, while the invention has been disclosed in conjunction with a computer keyboard, it will be apparent that it is useful in operating other types of keypads.

What is claimed is:

1. A joystick assembly for use with a computer having a keyboard, the keyboard including at least four predeterminately positioned cursor control keys for controlling a cursor position on a display of the computer, the control keys being spaced about a central key, the joystick assembly being adapted for actuating a plurality of control keys by lateral movement of a handle thereof, the joystick assembly comprising:
    a handle;
    a multi-arm member having a plurality of circumferentially spaced arms extending in a common plane from a center aperture, each of said arms having an end which depends from its associated arm such that each arm forms a substantially L-shaped member extending from the center aperture, said aperture being sized to accept entry of the handle therethrough; and
    means for pivotably attaching an end of sid handle to a central key of a keyboard whereby pivoting motion of said handle causes selected ones of said depending ends of the multi-arm member to depress selected cursor control keys for controlling the position of a cursor on a computer display, said means for attaching being mounted to said central key of said keyboard.

2. The joystick assembly of claim 1 wherein said depending ends of said spaced arms are of different lengths such that each of said ends is spaced an equidistance from an associated one of the control keys.

3. The joystick assembly of claim 1 wherein said attaching means comprises a relatively thin pad for fixed attachment to the central key and means for removably attaching said end of said handle to said pad.

4. The joystick assembly of claim 3 wherein said end of said handle is threaded and said pad includes a central threaded aperture for receiving said end of said handle in threaded engagement.

5. The joystick assembly of claim 3 wherein said end of said handle is of a reduced diameter and said pad includes a central aperture sized to frictionally engage said end of said handle.

6. The joystick assembly of claim 1 wherein said end of said handle is formed with a reduced diameter to permit pivotable movement of said handle about said end.

7. A joystick assembly comprising a handle, a key actuating member having a plurality of circumferentially spaced arms and means for attaching an end of said handle to a preselected key, said means for attaching being adhesively mounted to said peselected key, and said handle being removably attachable to said means for attaching, said actuating member being attachable to said handle whereby pivoting motion of said handle about said end forces selected ones of said arms to actuate selected keys spaced about said preselected key.

8. The joystick assembly of claim 7 wherein each of said arms has substantially an L-shape, an end of each L-shaped arm extending toward an associated key, each extending end being sized such that each arm terminates an equal distance from its associated key.

9. The joystick assembly of claim 7 wherein said handle has a reduced diameter portion adjacent said end thereof for imparting flexibility to allow pivoting motion.

10. A joystick assembly for actuating a plurality of push button switches distributed about a preselected mounting point, the assembly comprising:
    a handle;
    a multi-arm member having a plurality of circumferentially spaced arms extending in a common plane from a center aperture, each of said arms having an end which depends from its associated arm such that each arm forms a substantially L-shaped member extending from the center aperture, said aperture being sized to accept entry of the handle therethrough;

means for pivotably attaching an end of said handle to a central key of a keyboard whereby pivoting motion of said handle causes selected ones of said depending ends of the multi-arm member to depress selected cursor control keys for controlling the position of a cursor on a computer display, said means for attaching being mounted to said central key of the keyboard; and means for pivotably attaching an end of said handle to the preselected mounting point whereby pivoting motion of said handle causes selected ones of said depending ends of the multi-arm member to depress selected ones of the push button switches.

11. The joystick assembly of claim 10 wherein said handle has at least one area of reduced diameter allowing said handle to pivotably flex about said one area.

12. The joystick assembly of claim 11 wherein said pivotably attaching means comprising an adhesively mounted pad having an aperture for releasably engaging an end of said handle.

* * * * *